TIME DIVISION MULTIPLEX SWITCHING SYSTEM

Filed Dec. 13, 1967 4 Sheets-Sheet 1

INVENTOR
H. S. FEDER
BY
R. C. Winter
ATTORNEY

TIME DIVISION MULTIPLEX SWITCHING SYSTEM

Filed Dec. 13, 1967 4 Sheets-Sheet 4

United States Patent Office 3,522,381

Patented July 28, 1970

3,522,381

TIME DIVISION MULTIPLEX SWITCHING SYSTEM

Herbert S. Feder, Matawan, N.J., assignor to Bell Telephone Laboratories, Incorporated, Murray Hill, N.J., a corporation of New York Filed Dec. 13, 1967, Ser. No. 690,319

Int. Cl. H03j *3/00*

U.S. Cl. 179—15 12 Claims

ABSTRACT OF THE DISCLOSURE

A communication system is described in which intelligence signals are transferred between stations in communication via a 4-wire path. The signals are sampled on a time division basis, coded in a digital form and routed through a temporary storage medium, replacing the conventional switching network, to the appropriate destination.

BACKGROUND OF THE INVENTION

Techniques frequently employed in present day communication systems in the transfer of information from one locality to another are time sharing or time division multiplexing, pulse code modulation, and 4-wire transmission. These techniques are employed to a greater or lesser extent in many commercial systems, particularly in those employing the latest electronic devices.

Time division multiplexing permits the simultaneous exchange of information between each of a plurality of active pairs of terminals over a common communication highway or bus. This practice requires that, in successive short time intervals, each pair of terminals in communication be assigned a frequently recurring discrete time slot or channel in the common highway during which information may be sampled, transmitted and received. In the interval between apperances of the time slot assigned to a particular pair of terminals, the common bus is available to other active pairs of stations. By sampling at a sufficiently rapid rate, proper filtering, and lossless transfer of the sampled information to and from the common bus, an accurate reproduction of the information transmitted from one terminal of the pair may be formed at the other terminal of the pair.

In contemporary communication systems the intelligence signal sample originally is in pulse amplitude modulated (PAM) form, which form is susceptible to distortion and attenuation during transmission. Coding of the intelligence signal samples in some digital form to overcome these transmission problems is becoming increasingly popular. Also, burgeoning data exchange traffic forecasts the adoption of digital techniques throughout communication systems. Thus in centralized computer applications, information generated in a variety of forms may be coded in a single digital form utilizing, for example, pulse code modulation (PCM) for transmission to and from the central computer, with the likelihood of encountering transmission errors being reduced to a minimum.

If a digital code is adopted for a particular system application, a 4-wire transmission medium is preferable. In this instance, a 2- to 4-wire conversion between the station line and the local central office switching facilities is required. However, with recent developments in device technology, the need for hybrid circuits to perform such conversions is obviated. The provision of a 4-wire transmission facility, of course, eliminates the problems encountered in achieving bilateral amplification of the signals transmitted over relatively long distances.

All of these techniques are employed to some degree in a communication system as disclosed in D. B. James et al. Pat. 2,957,949, issued Sept. 11, 1958. In this arrangement synchronous time division switching is utilized at a remote line concentrator through which a plurality of stations have access over a lesser number of trunks to a remote switching network. In this instance PAM samples, transferred from a calling station on a time division basis, are coded in PCM form and transmitted to the remote central office via a 4-wire transmission path. This, of course, requires that all intelligence signals be transmitted between the pairs of stations in communication via the remote switching network in order to take advantage of the 4-wire transmission medium.

Furthermore, the capacity of such a system initially is established by the frequency and duration of intelligence signal sampling. Thus, for example, if system requirements dictate a two microsecond time slot at a 10 kHz. rate, the cycle time of 100 microseconds can accommodate up to 50 simultaneous connections involving 100 stations. System traffic requirements would then determine the maximum number of stations in the system. This number may be increased by employing several stages of time division switching, the stations being arranged in distinct groups, but such an arrangement in a system of the James et al. type would, of course, lead to considerable complexity in the requisite timing, switching and control equipment.

This division multiplex systems currently may be classified as fully synchronous, semisynchronous and nonsynchronous. In the first class, which is utilized in the James et al. system, sending stations are sampled in rotation, and the samples are transmitted in time sequence over the common transmission medium to the appropriate receiving stations, the latter being sampled in the same order in synchronism with the transmitting stations. All stations may be in close proximity and connected directly to the common medium, in which event a sample will be transferred from a sending station to the receiving station in the same time slot. However, if intermediate switching or long distance transmission is required, such that delays in transfer of the signal samples are encountered, the transfer of a sample will occur in the same time slot but in different cycles.

The non-synchronous class eliminates all control of intercoupling by a central sampling agency. In this instance, each sending station must apply to the signal which it transmits some characteristic uniquely identifying the receiving station, such as a distinctive pulse rate. Such systems are more flexible as to the capacity of the transmission medium in that a new pair of communicating stations may be added at any time so long as the assigned pulse rate is within the carrying capacity of the transmission medium. On other hand, such systems are wasteful of frequency space because a substantial separation is required between the pulse rates of adjacent transmission channels.

In the semisynchronous class, stations are again sampled on a sequential basis. However, the separation problems of the non-synchronous class and the complexities of control equipment and capacity limitations imposed on the synchronous class are obviated by assigning a destination address to each signal sample and transmitting the signal samples via the common medium on a sequential basis. Sorting then is accomplished by having each receiving station accept only those samples which are addressed to it.

SUMMARY OF THE INVENTION

In accordance with this invention the foregoing communication techniques are employed to advantage in a system in which the transfer of information between stations in communication is completed without requiring intelligence signal transfer through a remote central office as required in the aforementioned James et al. system. Thus a private branch exchange (PBX) type operation is achieved on a 4-wire basis. Furthermore, semisynchronous time division switching techniques are employed in a manner which avoids the problems encountered by James et al. when the system capacity is increased.

In brief, the stations are arranged in groups, with each station group having access to distinct send and receive buses on a time division basis. An intelligence signal sample from one station in each of the plurality of groups is transferred in one time slot in a repetitive cycle of time slots to a corresponding digital coding circuit via the corresponding group send bus. Subsequently, in a single time slot, all of the coded signal samples are passed through a temporary storage medium, designated the transfer store, where each sample is associated with a destination address which directs the accompanying signal sample to the proper one of a plurality of decoders. In a third time slot, the decoded signal samples are transferred from the decoders to the appropriate receiving stations via the corresponding group receive buses.

The major departure inherent in this approach is, of course, the substitution of the transfer store for the conventional switching network in systems such as that disclosed in the aforementional James et al. patent. The advantages attendant upon such a substitution are considerable in view of the difficulties encountered in designing fast acting switches for electronic systems. Furthermore, data links for the transmission of digital information to central computers, and paths for wide band signals such as television and carrier facilities all can be switched through the system by means of the transfer store.

In accordance with one aspect of this system arrangement, an additional coded word associated with each receiving circuit would establish the desired volume level at a particular station automatically. Thus, for example, in a telephone system a subscriber may determine the volume at which his telephone receiver is to be set by notifying the telephone office of the particular level desired. This level then is provided automatically to all signals incoming to his station simply by directing the corresponding digital code to the decoder associated with his station.

DRAWINGS

Figure 1:
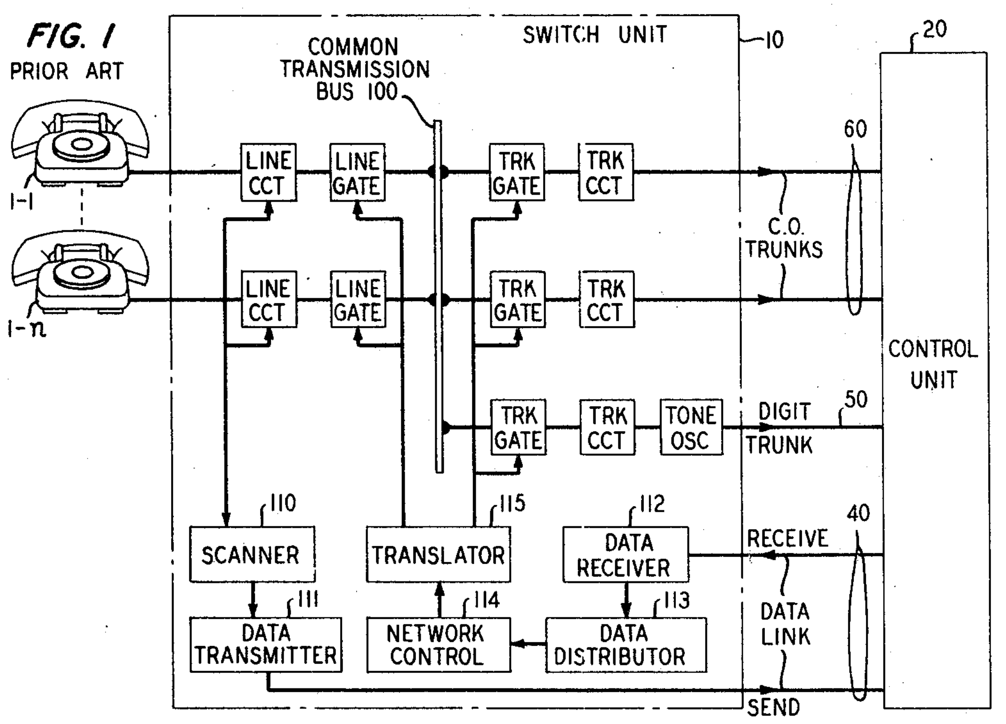
FIG. 1 PRIOR ART
FIG. 1 is a schematic representation in block diagram form of a communication system in which the arrangement in accordance with this invention may be employed.

Turning now to the drawing, the principal characteristics of an electronic PBX system, described in detail in R. C. Gebhardt et al. Pat. 3,225,144, issued Dec. 21, 1965, are illustrated in FIG. 1. For ease of understanding the operation of the instant invention, a brief description of this prior art system in which the invention may be incorporated is provided herewith.

Time division switching is based on the principle that periodic samples of an information signal are sufficient to completely define the signal and that such samples, derived from a multitude of signals, may be transmitted in a regular sequence over a time-shared common bus. Thus a pluralty of terminal stations, such as telephones 1–1 through **1–*n*, FIG. 1, are connected to a common transmission bus 100 through corresponding line gates, the latter being sampled on a selective basis for a predetermined time interval or time slot in a recurrent cycle of time slots. If a pair of gates is closed simultaneously for the prescribed time interval, a sample of the information available at each terminal will be transferred to the opposite terminal via bus 100** and the low pass filters included in each of the line circuits corresponding to the active gates. Thus a bilateral connection is established which, although physically connected for only a small fraction of the time, appears to be continuously connected because of the smoothing action of the low pass filters included in each of the line circuits.

It is characteristic of the operation of contemporary PBX's that they are self-contained, i.e., the transmission circuits, switching networks, and all control circuits are located in one unit at the customer's premises. The Gebhardt et al. system extends the common control concept by having a centrally located control unit 20 which directs the call processing in all of the remote switch units, including unit 10, via corresponding data links, such as link 40. More specifically, the switch unit 10 informs the control unit 20 of all changes in the supervisory status of telephone lines, trunks and attendant console keys, e.g., whether they are idle (on-hook) or busy (off-hook). The control unit 20 then performs all of the decision-making tasks of call processing.

The operation of switch unit 10 may be understood more fully upon consideration of a typical intra-PBX call. Assume telephone 1–1, FIG. 1, goes off-hook. This change of status is recognized by scanner 110 which, in turn, formulates a message containing the corresponding line number and the new supervisory state. This information is transmitted to control unit 20 via data transmitter 111 and the send leg of data link 40.

Control unit 20, recognizing that there is no call which involves this particular line, determines that the off-hook indication is a request for service and proceeds to set up a digit-receiving connection. For this purpose a message is sent to switch unit 10 via the receive leg of data link 40, specifying that telephone 1–1 be connected to a preselected digit trunk 50. This message is received by data receiver 112 and transferred to network control 114 via data distributor 113. Network control 114, in turn, stores the calling line number, together with the designation of an available digit trunk 50. Thereafter, in a discrete time slot of the repetitive cycle, this information is translated in translator 115, and appropriate control signals are applied simultaneously to the gates controlling the connection of telephone 1–1 and digit trunk 50 to common transmission bus 100. Such a connection thus is effected during the predetermined time slot in the repetitive cycle. At the same time, control unit 20 transmits dial tone via digit trunk 50 to telephone 1–1.

Telephone 1–1 now proceeds to dial or otherwise transmit the digits representing the called line, in this instance assumed to be telephone **1–*n*. Upon receipt of all of the called line digits, control unit 20 transmits a message to switch unit 10 which identifies the called telephone 1–*n* and substitutes its number for the number of digit trunk 50 as contained in network control 114, together with the number of the calling telephone 1–1. The effect of this alteration in the content of the network control memory is to connect telephone 1–*n* to common bus 100 in the same time slot as telephone 1–1 is connected thereto, while inhibiting further connection of digit trunk 50 to bus 100 in this time slot. Appropriate ringing tone connections are also established in this time slot, which connections are automatically removed upon answer at the called telephone 1–*n***.

Figures 2, 6:
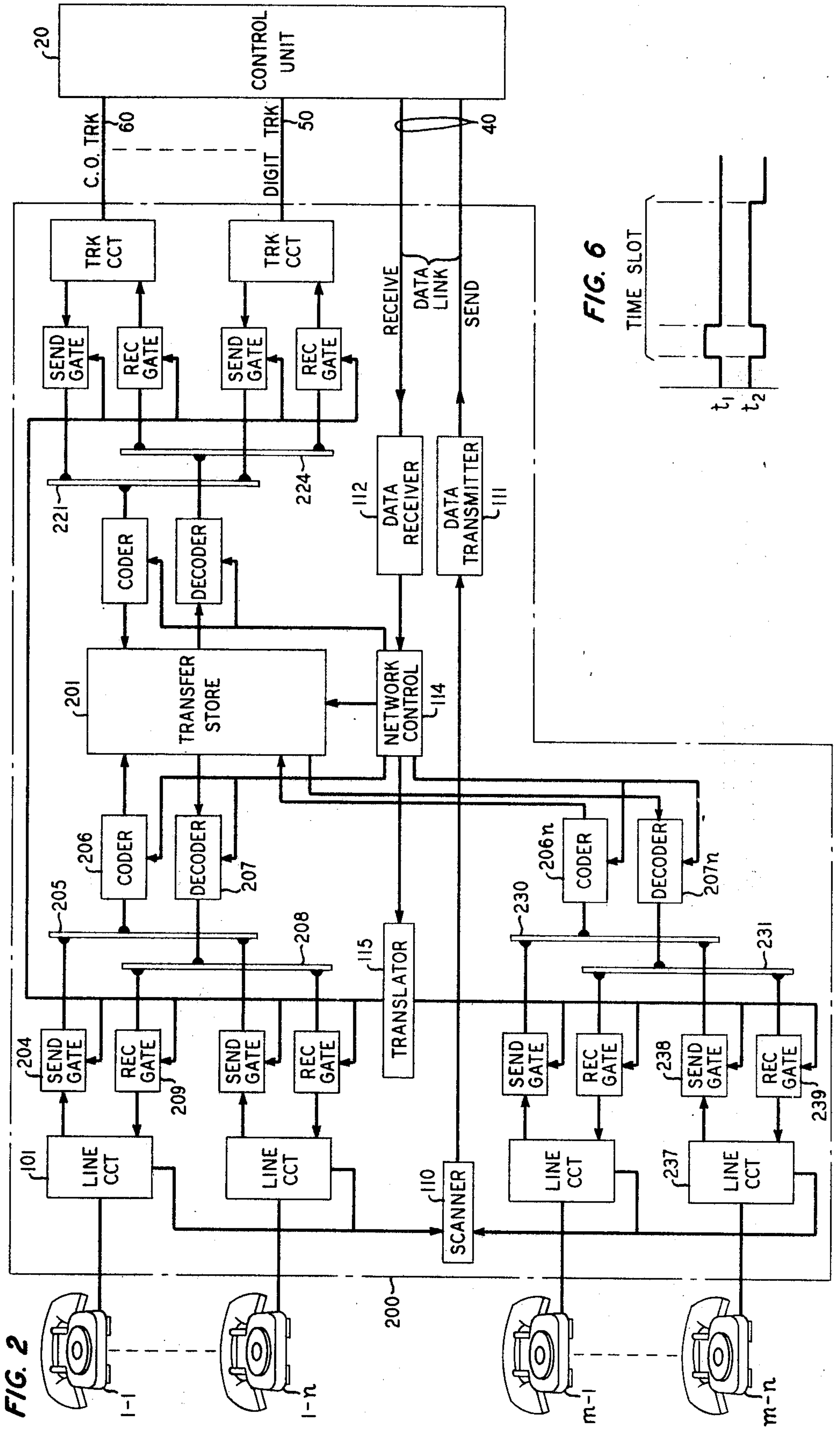
FIG. 2 is a schematic representation of a specific arrangement of the switching, transmission and control facilities in accordance with this invention which may be employed in the system of FIG. 1.
FIG. 6 indicates the timing or control pulses occurring in each time slot.

Turning now to FIG. 2, a system arrangement in accordance with this invention is depicted. As noted therein the general system arrangement corresponds to that depicted in the prior art system, FIG. 1. However, a marked improvement in system performance is realized by incorporating the transfer store 201, with its accompanying coders and decoders, in the network.

Another departure from the system depicted in FIG. 1 is required due to the conversion from PAM to PCM signaling, which entails the use of 4-wire transmission. Thus the bilateral line gates of FIG. 1 are replaced by send and receive gates, such as 204 and 209, and common transmission bus 100 in FIG. 1 is replaced by group send bus 205 and group receive bus 208. The stations are divided into distinct groups which share corresponding ones of the common transmission buses. Also each group bus terminates a single coder and decoder. Thus stations *m*–1 through *m*–*n* are connected to group send bus 230 and group receive bus 231, which in turn are connected to transfer store 201 through coder 206*n* and decoder 207*n*. Similarly, central office and digit trunks are terminated on send bus 221 and receive bus 224. With this arrangement a plurality of line groups may be served by the same transfer store.

Consider for example a 10,000 line system. In this instance, each coder and decoder will be associated with a distinct group of 400 lines on a corresponding time division bus. The time cycle for transmission over each time division bus will involve 45 time slots of 2.78 microseconds duration. Three distinct operations occur simultaneously in each time slot; viz, a signal sample is transferred from one sending station in each group to the corresponding coder, the transfer store delivers the information it receives from all of the coders to all of the decoders, and finally all signal samples available in the decoders are transferred to the appropriate destinations. For this purpose the transfer store operates at an 18 megahertz rate in order to transfer all of the available information between coders and decoders, through store 201, in a single time slot interval of 2.78 microseconds.

The various control elements operate as described for the system depicted in FIG. 1, with the exception that network control 114 now also directs the operation of transfer store 201 to transfer intelligence signals between the coders and decoders. The various coders and decoders illustrated in FIG. 2 serve to convert intelligence signal samples between the PAM form in which they are available on the group buses and a PCM form for processing by transfer store 201.

Consider then, for purposes of illustration, that station 1–1 is in communication with station *m*–*n*. An intelligence signal sample from station 1–1 will be transmitted through line circuit 101 to send gate 204 where, in a preassigned time slot, it is sampled and delivered through group send bus 205 to coder 206. During the succeeding time slot, the coded signal sample is transmitted from coder 206 to transfer store 201. Subsequently, in the same time slot, transfer store 201 will expose all of the decoder inputs to the corresponding PCM form of this signal sample, and in a subsequent time slot, the decoded signal sample will be transferred from the addressed decoder 207*n* through group receive bus 231 to station *m*–*n* via receive gate 239 and line circuit 237. In similar fashion a signal originating at station *m*–*n* will be sampled at send gate 238 in the preassigned time slot, converted to PCM form in coder 206*n* after transfer via send bus 230, shifted through transfer store 201, decoded in decoder 207, and transferred to station 1–1 via receive bus 208, receive gate 209 and line circuit 101.

The operations required in the 2- to 4-wire conversion as well as the coding and decoding conversion between PAM and PCM are familiar to the art. Of particular interest in the instance arrangement is the operation of transfer store 201 in relation to the other system components. It is significant that such a store is capable of transferring information between stations arranged in groups and communicating on a time division basis in which the same time cycle is employed in common by all groups. Typically the transfer store 201 comprises a shift register or delay line, as well known in the art, to execute the requisite transfer operations. For example, a domain wall shift register of the type disclosed in a patent application of R. A. Kaenel, Ser. No. 543,699, filed Apr. 19, 1966, now Pat. 3,496,301, issued Feb. 17, 1970, would be suitable for this purpose.

Figure 4:
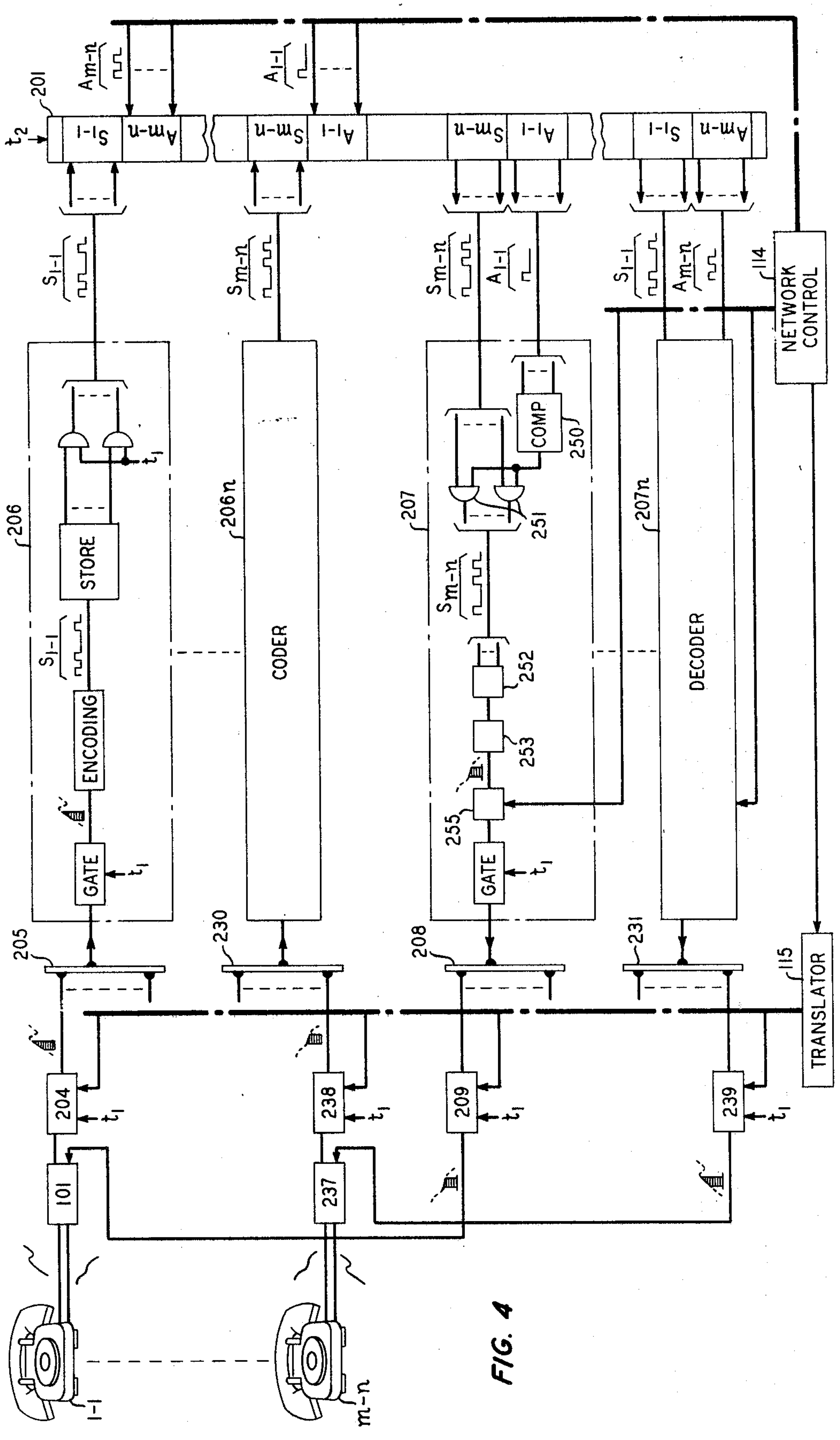
FIG. 4 depicts particular elements of the system in greater detail to illustrate a station-to-station connection.

The unique operation of transfer store 201 will be evident from consideration of the arrangement depicted in FIG. 4. As noted therein, transfer store 201 is arranged to receive each coder output in a distinct storage area together with a destination address received simultaneously from network control 114. Thus a distinct storage area, capable of registering a coded signal sample received from each one of the system coders, such as 206 and 206*n*, in a single time slot, is available in transfer store 201. In each time slot transfer store 201 will receive the coded samples together with the destination addresses and will shift them in the direction indicated by the arrow so as to expose them to all of the system decoders, such as 207 and 207*n*.

In the FIG. 4 example, the coded signal sample $S_{1\text{-}1}$ is registered with destination decoder address $A_{m\text{-}n}$ in the storage area reserved for the first group of stations, and at the same time, $S_{m\text{-}n}$ is registered with $A_{1\text{-}1}$ in the storage area reserved for the last group of stations. Later in the same time slot these samples will be shifted past each decoder input, so that the matching addresses can be detected and the corresponding samples transferred into the decoders.

Figure 3:
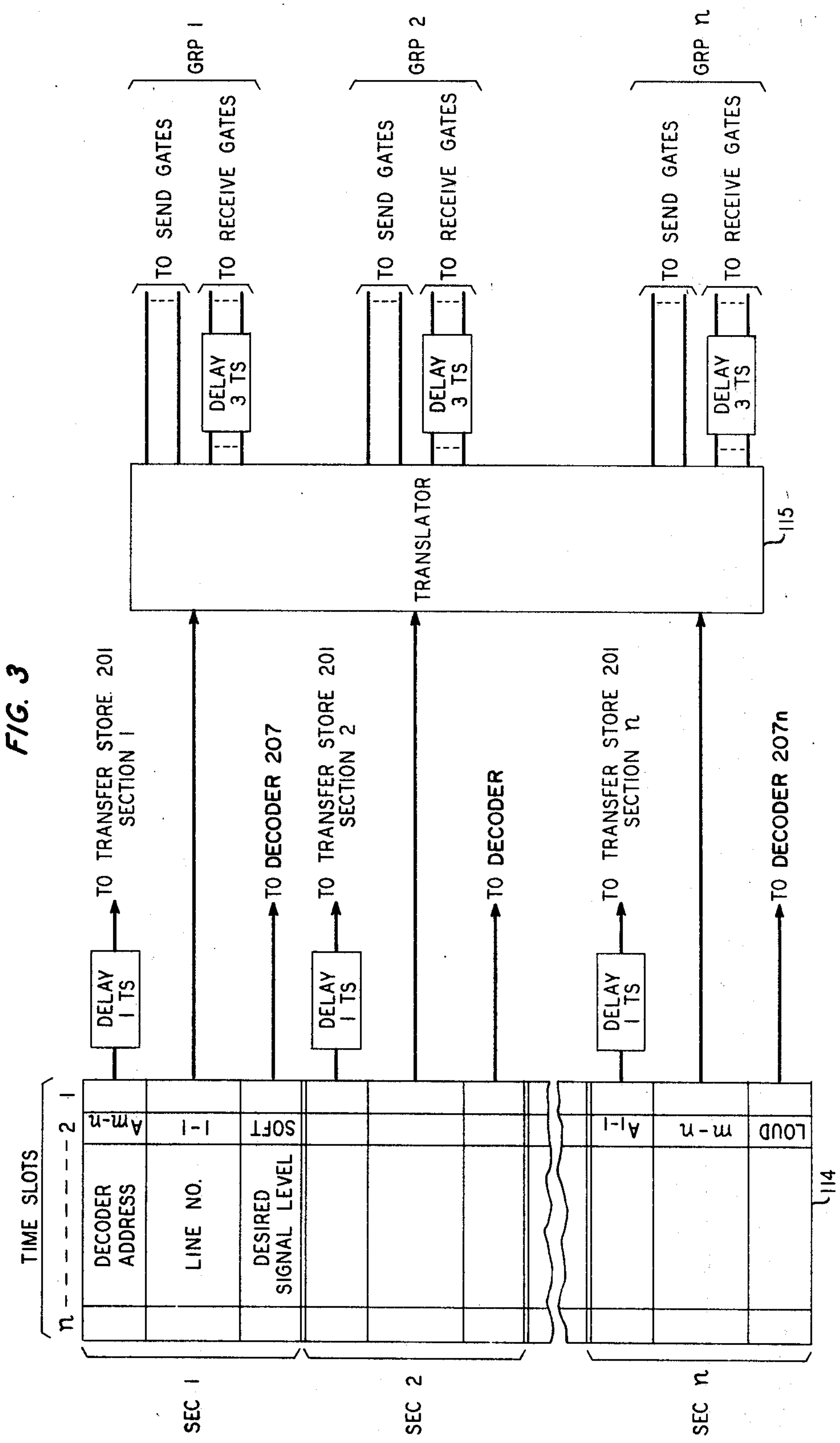
FIG. 3 is a representation of the type of information contained in the network control memory utilized in the system of FIG. 2.

Network control 114 contains a memory array, which may be of the form disclosed in the aforementioned Gebhardt et al. patent, in which is stored information necessary to control the signal transfer operation. The content of this memory is shown in FIG. 3. As noted therein the memory is divided into sections 1 through *n*, each section corresponding to a distinct group of stations in the system. Thus section 1 corresponds to the group including stations 1–1 through 1–*n*, and section *n* corresponds to the group including stations *m*–1 through *m*–*n*. Each section in turn is divided into *n* subsections corresponding to the number of time slots in the cycle. Each subsection contains the information necessary to control the various transfer operations performed during the time slot; viz, the decoder address, the line number of the particular station in the group assigned to this time slot, and the desired signal level for this station.

The decoder address is inserted in transfer store 201 concurrent with receipt therein of the coded signal sample from the corresponding station group in that time slot. The line number, of course, is directed through translator 115 at the beginning of the assigned time slot to enable the appropriate send gate and, after a three time slot delay, the appropriate receive gate.

The desired signal level is determined in accordance with advice from the subscriber and the corresponding code is applied to the decoder for his group to adjust the incoming signal accordingly. The actual level adjustment may be performed by directing the incoming signals through a selected one of a group of amplifiers, as noted in more detail hereinafter.

FIG. 6 depicts a simple timing chart for the various pulses generated by the office clock and occurring during each time slot. Thus, advantageously, the $t_1$ pulse is applied during the first portion of the time slot, and the $t_2$ pulse, which directs the signal transfer through transfer store 201, occurs during the latter portion of each time slot. Each $t_1$ pulse is applied to the line gates, the coder input gates and the decoder output gates. The $t_2$ pulse is applied only to the transfer store 201.

Turning again to FIGS. 3 and 4, the complete transfer operation between pairs of stations in communication is illustrated with reference to the first and last station groups, the associated coders and decoders, and the transfer store. For purposes of this illustration, it is assumed that stations 1–1 and *m*–*n* are in communication, having been assigned time slot 2 for sending and time slot 5 for receiving signals. It may also be assumed that a signal sample from each of these stations is available in the corresponding line circuits immediately prior to the appearance of time slot 2 in a given cycle of operation. Thus at the beginning of time slot 2, a gate control pulse is applied by translator 115 to send gates 204 and 238 in response to the line number designation stored in subsection 2 of sections 1 and *n* of network control 114, as noted in FIG. 3. Upon concurrent receipt of the $t_1$ pulse, send gates 204 and 238 transfer the available signal samples in pulse amplitude modulated form via the corresponding send buses 205 and 230 to the respective coders 206 and 206*n*. For purposes of illustration, gate circuits are also indicated at the input of each coder, which gate crcuits also receive the $t_1$ timing pulse. Thus the PAM signal transfer in time slot 2 between the sending stations and the encoding portion of coders 206 and 206*n* is completed during the $t_1$ interval.

During the interval $t_2$ in time slot 2, the PAM samples are encoded and transferred to the storage portion of coders 206 and 206*n*. Thus at the end of time slot 2, the signal samples are available in coded form for the next step in the transfer operation.

At the beginning of time slot 3, two distinct transfer operations occur which affect the coded signal samples $S_{1\text{-}1}$ and $S_{m\text{-}n}$ from stations 1–1 and *m–n* respectively. They are transferred in parallel from the respective coders 206 and 206*n* into the appropriate sections of transfer store 201 during the $t_1$ interval, and at the same time decoder addresses $A_{m\text{-}n}$ and $A_{1\text{-}1}$ are transferred into the corresponding sections of store 201. This operation involves a transfer through the coder output gates of the coded signals, as indicated in FIG. 4, in conjunction with the transfer of the destination decoder addresses supplied by network control 114 at this time. A timing pulse $t_2$, applied to transfer store 201, then shifts the stored information past all of the exits to the decoders. If the matching address is available in a particular decoder comparison circuit, the stored information having the corresponding address will be transferred into that decoder. Since the coded signal sample $S_{1\text{-}1}$ from coder 206 is stored with the address $A_{m\text{-}n}$ of decoder 207*n*, that decoder alone will be enabled at this time to receive this particular coded signal sample from transfer store 201. Similarly, decoder 207 will receive the coded signal sample $S_{m\text{-}n}$ from coder 206*n* during time slot 3.

It is apparent, of course, that conversations involving the transfer of signal samples from other station groups during time slot 2 also will experience such a coded signal sample transfer during time slot 3. Furthermore, signal samples from other sending stations will be transferred into the coders during time slot 3. Thus a continuous stream of information is processed through the network, with each signal sample requiring a four time slot interval to complete the journey.

During time slot 4, the coded signal samples received in decoders 207 and 207*n* will be decoded in the decoding circuit 252 and stored temporarily in store 253 preparatory to the final transfer operation. Thus in time slot 5, upon occurrence of the $t_1$ clock pulse, the decoded signal samples are transferred in PAM form from the respective decoders through the corresponding receive buses 208 and 231 and receive gates 209 and 239 to the receiving stations.

The operation required to permit the transfer of a particular message into the desired one of the decoders may be accomplished by the provision of a simple comparison circuit such as circuit 250 in decoder 207. The address of decoder 207 is stored in comparison circuit 250. Thue when the corresponding destination address appears at the input to decoder 207, comparison circuit 250 will provide an output signal to enable input gates 251, which in turn transmit the associated stored signal sample, $S_{m-n}$, in parallel to the decoding circuit 252. For this purpose a series of coincidence logic gates as known in the art may comprise comparison circuit 250.

Figure 5:
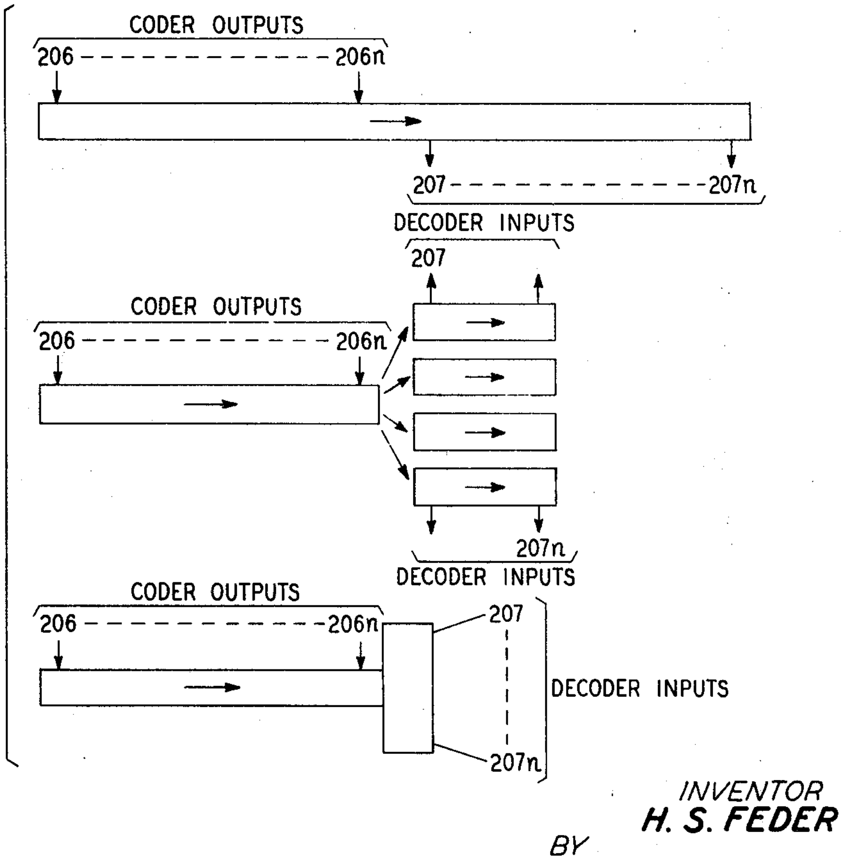
FIG. 5 depicts various forms which the transfer store in the system of FIG. 2 may take.

Alternative arrangements for transferring the stored information through transfer store 201 are illustrated in FIG. 5. The top diagram indicates the method employed in accordance with the description in FIG. 4, i.e., input information is stored in parallel, shifted through transfer store 201 in series past each of the decoder inputs and retrieved in parallel when a match occurs. The middle diagram indicates that the information is applied in parallel from the coder outputs, but the transfer operation now separates the stored information into four distinct groups for transmission past the corresponding decoder inputs. Such an arrangement requires more logic than the previous example but conveys all of the information to the decoder inputs in less time. The time saving may be utilized to increase the number of coders and decoders thereby increasing the system capacity. The arrangement indicated in the lower figure in FIG. 5 carries the philosophy of the previously described arrangement to its extreme. Thus the series information transfer is fanned out to all of the decoder inputs in parallel.

The operation depicted in FIG. 4 covers all inter-group call connections. However, if the communicating stations are assigned to the same group, the intra-group call connection may be completed simply by assigning different time slots to each of the stations and by establishing a dummy terminal in another group, e.g., the trunk group. Thus during the sending and receiving time slots assigned to one of the stations, a transfer is effected with the dummy terminal in which a signal sample is stored thereat. Then in the receiving time slot assigned to the second station, the signal sample stored at the dummy terminal will be transferred to the second station.

The arrangement in accordance with the embodiment of this invention is adapted to the custom-tailoring of the audio level at each station in the system. Thus each subscriber simply notifies the telephone office of his particular requirements and a digital code, corresponding to the level of amplification which will satisfy the particular subscriber's requirements, is stored in network control 114, FIG. 4, on each occasion that this particular station is involved in a call connection. For example, FIG. 3 indicates a soft level code stored in section 1, time slot 2. Thereafter, upon each occurrence of the time slot assigned to the particular station, the coded gain designation is applied to gain control circuit 255. This circuit serves, in this instance, to switch a particular amplifier into the decoder output path such that the decoded signal sample directed to the particular station is amplified to the desired level. Gain control circuit 255 may comprise a plurality of amplifiers, each providing a distinct amount of gain, which are switched selectively into the transmission path.

It is to be understood that the above described arrangements are illustrative of the application of the principles of the invention. Numerous other arrangements may be devised by those skilled in the art without departure from the spirit and scope of this invention.

What is claimed is:

1. In a communication system comprising a plurality of stations, means for transferring signal samples concurrently from sending ones of said stations, means for associating each of said transferred signal samples with the address of the corresponding receiving station, and means operative in response to receipt of said associated addresses for directing said signal samples concurrently to said receiving stations.

2. A signal transfer system comprising a plurality of stations, coding means, means for transferring signal samples from selected ones of said stations to said coding means in a first distinct time slot of a repetitive cycle, decoding means, means for transferring the resultant coded signal samples together with destination station addresses to said decoding means in a second distinct time slot and means for transferring all of the decoded signal samples to corresponding destination stations in a third distinct time slot.

3. A signal transfer system comprising a plurality of lines, a transfer store, means for transmitting signal samples concurrently from originating ones of said lines to said store, means for associating each of said signal samples received concurrently in said store with the corresponding destination address and means for directing said signal samples from said store to the lines designated by said destination addresses.

4. A signal transfer system in accordance with claim 3 wherein said directing means comprises a plurality of decoders and wherein said transfer store comprises means for registering each of said signal samples and the corresponding destination address in a discrete storage area and means for presenting the registered information to each of said decoders.

5. A signal transfer system in accordance with claim 4 wherein said directing means further comprises means for comparing said registered information with a designation assigned to each of said decoders and means operative upon detection of a match between said decoder designation and one of said destination addresses for gating the associated signal sample into the corresponding one of said decoders.

6. A signal transfer system in accordance with claim 5 wherein said directing means further comprises a plurality of distinct transmission buses, first gating means connected between each line designated by said destination address and a distinct one of said buses, second gating means connected between each of said decoding means and a distinct one of said buses and means for enabling said first and second gating means simultaneously.

7. A signal transfer system comprising means for coding signal samples transmitted concurrently from a plurality of sending stations, a plurality of decoders for decoding said coded signal samples, a transfer store for associating each of the coded signal samples concurrently with the address of the corresponding decoder and means for directing signal samples from said decoders concurrently to said corresponding receiving station.

8. A signal transfer system in accordance with claim 7 and further comprising means for comparing each of the decoder addresses contained in said store with the address of a particular decoder an means responsive to a match for enabling said particular decoder to receive the associated coded signal sample.

9. A signal transfer system in accordance with claim 7 wherein said directing means comprises amplifying means and means for selecting the amount of gain provided by said amplifying means in accordance with a value prescribed by the corresponding destination station.

10. Apparatus for transferring an intelligence signal between sending and receiving stations in a communication system comprising means for simultaneously sampling the intelligence signals available at a plurality of stations, means for coding the resultant intelligence signal samples during a first time slot, means for associating said coded signal samples with distinct destination addresses and means for comparing each of said destination addresses with the address of the receiving station during a second time slot, means for decoding the associated signal sample upon detection of an address match during a third time slot and means for applying the decoded signal samples to the receiving stations during a fourth time slot, said first, second, third and fourth time slots appearing in succession in a repetitive cycle of time slots.

11. In a time division switching system a plurality of stations arranged in distinct groups, means for establishing connections to said stations in distinct time slots of a repetitive cycle, means for coding a signal sample received from one station in each of said groups in one time slot, means for storing each of said coded signal samples with a distinct address and means for directing the signal samples to the appropriate destination stations in another time slot according to the address with which each sample is stored.

12. In a time division switching system the combination according to claim 11 wherein said directing means comprises a decoder corresponding to each of said groups, means associated with each of said decoders for comparing the addresses in said storing means with the address of said associated decoder and means operative in response to a match in said comparing means for enabling the associated decoder to receive the coded signal sample stored with the compared address in said storing means.

References Cited

UNITED STATES PATENTS

| | | | |
|---|---|---|---|
| 2,946,044 | 7/1960 | Bolgiano | 179—15 |
| 3,263,030 | 7/1966 | Stiefel | 179—15 |

KATHLEEN H. CLAFFY, Primary Examiner

A. B. KIMBALL, JR., Assistant Examiner

U.S. Cl. X.R.

179—18; 340—147